(12) United States Patent
Kobayashi

(10) Patent No.: US 9,765,851 B2
(45) Date of Patent: Sep. 19, 2017

(54) POWER TRANSMISSION BELT AND BELT TRANSMISSION SYSTEM INCLUDING THE POWER TRANSMISSION BELT

(71) Applicant: BANDO CHEMICAL INDUSTRIES, LTD., Kobe-shi (JP)

(72) Inventor: Shogo Kobayashi, Kobe (JP)

(73) Assignee: BANDO CHEMICAL INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 15/334,745

(22) Filed: Oct. 26, 2016

(65) Prior Publication Data
US 2017/0045116 A1    Feb. 16, 2017

Related U.S. Application Data

(63) Continuation of application No. PCT/JP2014/005664, filed on Nov. 11, 2014.

(30) Foreign Application Priority Data

Jun. 20, 2014  (JP) .................................. 2014-127322

(51) Int. Cl.
| F16G 1/00 | (2006.01) |
| F16G 5/08 | (2006.01) |
| F16G 1/08 | (2006.01) |
| F16G 5/06 | (2006.01) |
| F16G 5/20 | (2006.01) |
| F16G 1/10 | (2006.01) |

(Continued)

(52) U.S. Cl.
CPC ............... *F16G 5/08* (2013.01); *F16G 1/08* (2013.01); *F16G 1/10* (2013.01); *F16G 1/28* (2013.01); *F16G 5/06* (2013.01); *F16G 5/20* (2013.01); *F16H 7/02* (2013.01); *F16H 7/023* (2013.01)

(58) Field of Classification Search
CPC .. D02G 3/447; F16G 1/28; F16G 5/06; F16G 5/20; F16G 1/10
USPC .................................................... 474/260, 237
See application file for complete search history.

(56) References Cited

U.S. PATENT DOCUMENTS 2,235,082 A * 3/1941 Parker ...................... D02G 3/48
                                                  152/451
4,652,252 A * 3/1987 Westhoff ................ B29D 29/08
                                                  474/204

(Continued)

FOREIGN PATENT DOCUMENTS

| CA | 2074770 | 1/2003 |
| CN | 101147001 | 3/2008 |

(Continued)

*Primary Examiner* — Henry Liu
(74) *Attorney, Agent, or Firm* — Knobbe Martens Olson & Bear LLP

(57) ABSTRACT

A power transmission belt has a cord embedded in a belt body made of rubber. The cord is configured as a plied yarn with a total fiber fineness of 4000 to 5000 dtex. The plied yarn consists of four primarily-twisted yarns, each being obtained by subjecting a bundle of para-aramid fibers with a fiber fineness of 1000 to 1250 dtex to a primary twist in one direction at a twist coefficient of 1200 to 1350, and these four primarily-twisted yarns are then secondarily twisted in the opposite direction to the primary twist at a twist coefficient of 900 to 1100, thereby obtaining the plied yarn.

14 Claims, 8 Drawing Sheets

(51) Int. Cl.
*F16G 1/28* (2006.01)
*F16H 7/02* (2006.01)

(56) References Cited

U.S. PATENT DOCUMENTS

| | | | | |
|---|---|---|---|---|
| 4,787,200 A | * | 11/1988 | Inada | D02G 3/28 57/236 |
| 4,790,802 A | * | 12/1988 | Onoe | F16G 1/08 474/260 |
| 4,832,102 A | * | 5/1989 | Domchick | B60C 9/0042 152/451 |
| 5,223,061 A | * | 6/1993 | Navaux | B60C 9/2009 152/527 |
| 5,242,743 A | * | 9/1993 | Nakanishi | B29C 70/16 156/138 |
| 5,259,822 A | * | 11/1993 | Nakanishi | B29C 70/16 474/205 |
| 5,268,221 A | * | 12/1993 | Nakanishi | B29C 70/16 152/556 |
| 5,425,681 A | * | 6/1995 | Van Hook | D02G 3/447 474/263 |
| 5,505,667 A | * | 4/1996 | Van Hook | D02G 3/447 474/208 |
| 5,521,007 A | * | 5/1996 | Kurokawa | D02G 3/26 152/451 |
| 5,735,763 A | * | 4/1998 | Kawahara | F16G 1/08 474/263 |
| 5,802,839 A | * | 9/1998 | Van Hook | D02G 3/28 474/263 |
| 5,891,561 A | * | 4/1999 | Kinoshita | F16G 5/06 428/295.1 |
| 6,176,799 B1 | * | 1/2001 | Kinoshita | F16G 1/28 428/337 |
| 7,780,560 B2 | * | 8/2010 | Lofgren | F16G 1/10 156/139 |
| 8,012,056 B2 | * | 9/2011 | Di Meco | D02G 3/447 474/263 |
| 8,057,344 B2 | * | 11/2011 | Wu | F16G 1/28 474/205 |
| 2003/0087715 A1 | * | 5/2003 | Fujimoto | B32B 25/02 474/237 |
| 2007/0259746 A1 | * | 11/2007 | Wu | F16G 1/28 474/260 |
| 2007/0292291 A1 | | 12/2007 | Schneider et al. | |
| 2007/0292292 A1 | | 12/2007 | Schneider | |
| 2008/0014108 A1 | | 1/2008 | Schneider | |

FOREIGN PATENT DOCUMENTS

| | | |
|---|---|---|
| JP | 02-42230 A | 2/1990 |
| JP | 5-44131 A | 2/1993 |
| JP | 2003-130137 A | 5/2003 |
| JP | 2005-265106 A | 9/2005 |
| JP | 2009-74210 A | 4/2009 |
| JP | 2009-79337 A | 4/2009 |

* cited by examiner

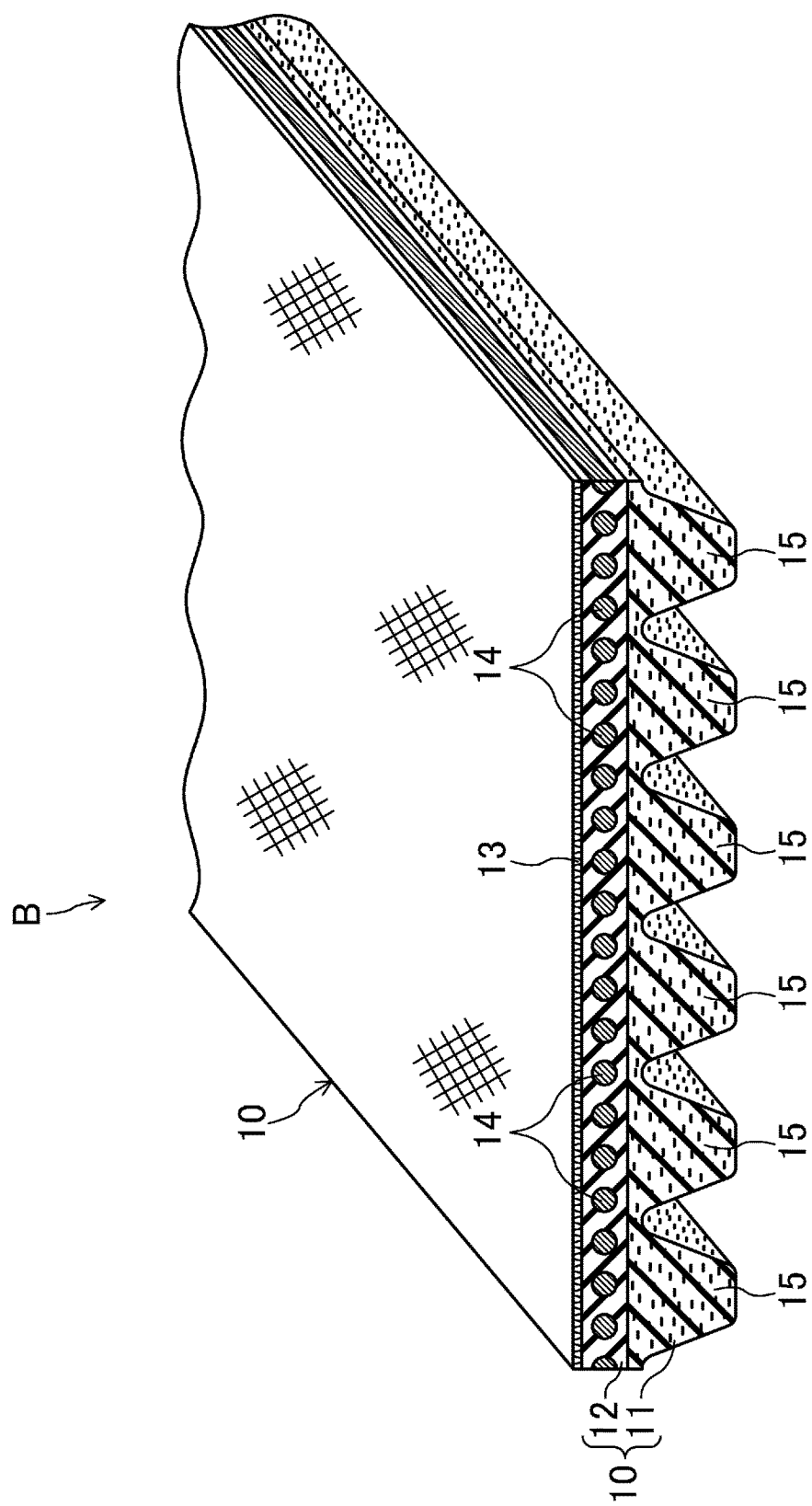

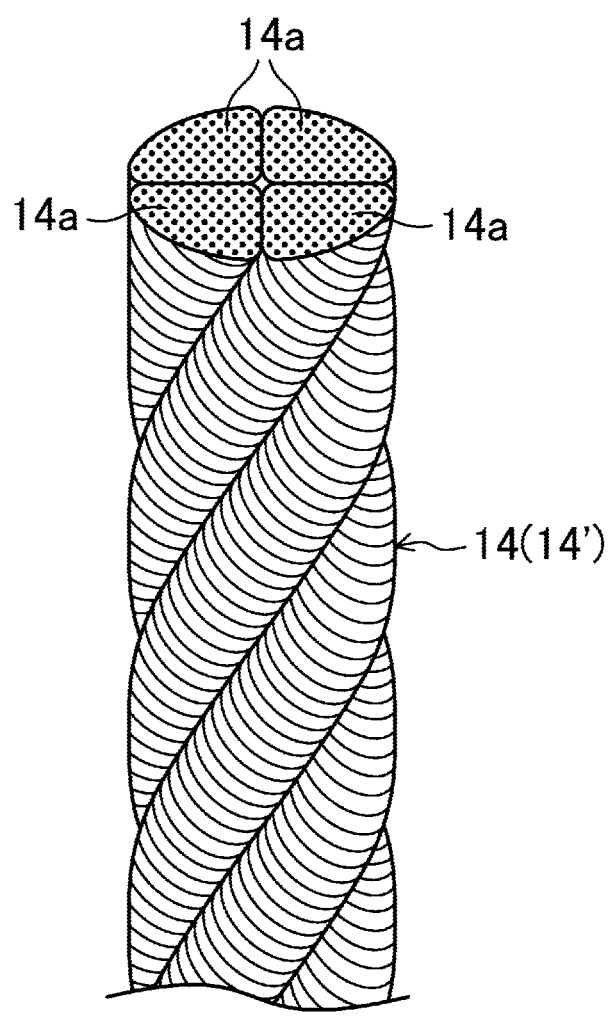

POWER TRANSMISSION BELT AND BELT TRANSMISSION SYSTEM INCLUDING THE POWER TRANSMISSION BELT

CROSS-REFERENCE TO RELATED APPLICATIONS

This is a continuation of International Application No. PCT/JP2014/005664 filed on Nov. 11, 2014, which claims priority to Japanese Patent Application No. 2014-127322 filed on Jun. 20, 2014. The entire disclosures of these applications are incorporated by reference herein.

BACKGROUND

The present invention relates to a power transmission belt and a belt transmission system including the power transmission belt.

It is known that para-aramid fibers can be used as a cord of a power transmission belt.

Patent Document 1 (Japanese Unexamined Patent Publication No. 2005-265106) discloses using a plied yarn with a total fiber fineness of 9900 dtex as a cord of a double cogged V belt.

This plied yarn consists of three primarily-twisted yarns, each of which is obtained by primarily twisting a bundle of para-aramid fibers with a fiber fineness of 1650 dtex, in one direction at a twist coefficient of 4.3. Then, these three primarily-twisted yarns are secondarily twisted in the opposite direction to the primary twist at a twist coefficient of 3.6, thereby obtaining the plied yarn. According to Patent Document 1, the twist coefficient is calculated by the following equation:

$$\text{twist coefficient} = 0.496 \times \text{number of twists(twists/10 cm)} \times (\text{fiber fineness (dtex)})^{1/2}$$

SUMMARY

The present invention provides a power transmission belt with a cord embedded in a belt body made of rubber. The cord is configured as a plied yarn with a total fiber fineness of 4000 to 5000 dtex. The plied yarn consists of four primarily-twisted yarns, each of which is obtained by subjecting a bundle of para-aramid fibers with a fiber fineness of 1000 to 1250 dtex to a primary twist in one direction at a twist coefficient of 1200 to 1350. The four primarily-twisted yarns are subjected to a secondary twist in an opposite direction to the primary twist at a twist coefficient of 900 to 1100 to make the plied yarn.

BRIEF DESCRIPTION OF THE DRAWINGS

FIG. 1 is a perspective view of a V-ribbed belt according to an embodiment.

FIG. 2 is a perspective view of a plied yarn which serves as a cord.

DETAILED DESCRIPTION

Figure 3A:
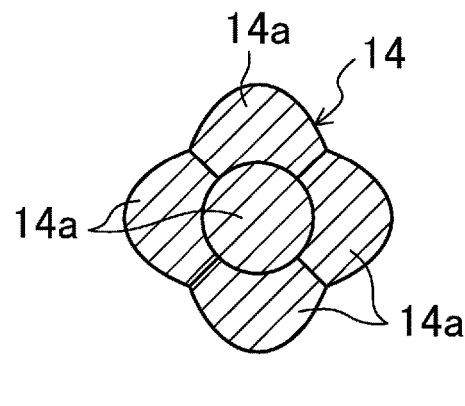
FIG. 3A is a cross-sectional view of a cord consisting of five primarily-twisted yarns.

Embodiments will now be described in detail with reference to the drawings.

(V-Ribbed Belt B)

FIG. 1 illustrates a V-ribbed belt B (a power transmission belt) according to an embodiment. The V-ribbed belt B of this embodiment is, for example, an endless belt used in an accessory drive belt transmission system provided in the engine compartment of an automobile. The V-ribbed belt B of this embodiment has, for example, a length of 700 to 3000 mm, a width of 10 to 36 mm, and a thickness of 4.0 to 5.0 mm.

The V-ribbed belt B of this embodiment includes a V-ribbed belt body 10 made of rubber and has a double layer structure comprised of a compressed rubber layer 11 which serves as a pulley contacting portion on the inner periphery of belt, and an adhesive rubber layer 12 on the outer periphery of the belt. A backside reinforcing fabric 13 is adhered to the outer periphery of the adhesive rubber layer 12 of the V-ribbed belt body 10. Further, a cord 14 is embedded in the middle of the thickness of the adhesive rubber layer 12 so as to form a helical pattern having a predetermined pitch in the belt width direction. The backside reinforcing fabric 13A may be replaced with a backside rubber layer.

The compressed rubber layer 11 has a plurality of V-shaped ribs 15 that protrude perpendicularly toward the inner peripheral surface of the belt. The plurality of V-shaped ribs 15 each have the shape of a rib extending in the belt length direction and an approximately inverted triangular cross-section, and are arranged side by side in the belt width direction. Each of the V-shaped ribs 15 has, for example, a height of 2.0 to 3.0 mm, and a width of 1.0 to 3.6 mm between their bases. The number of the V-shaped ribs may be three to six (e.g., six in the example in FIG. 1).

The adhesive rubber layer 12 is in the shape of a strip with a horizontally-elongated rectangular cross-section, and has a thickness of 1.0 to 2.5 mm, for example.

The compressed rubber layer 11 and the adhesive rubber layer 12 are made of rubber compositions produced by heating and pressing an uncrosslinked rubber composition prepared by kneading and mixing a rubber component with various ingredients, and then by crosslinking the kneaded product with a crosslinker. The rubber composition may be obtained through crosslinking using sulfur as the crosslinker, or may be obtained through crosslinking using an organic peroxide as the crosslinker. The makeups of the rubber compositions that make the compressed rubber layer 11 and the adhesive rubber layer 12 may be either different from each other or the same as each other.

Examples of the rubber component of the rubber compositions that make the compressed rubber layer 11 and the adhesive rubber layer 12 include an ethylene-α-olefin elastomer (e.g., EPDM and EPR), chloroprene rubber (CR), chlorosulfonated polyethylene rubber (CSM), and hydrogenated acrylonitrile-butadiene rubber (H-NBR). Examples of the ingredients include a reinforcing material, a filler, an antioxidant, a softener, a crosslinker, and a vulcanization accelerator.

Short fibers, such as nylon short fibers, may be mixed in the rubber compositions making the compressed rubber layer 11. In that case, it is preferred that the short fibers included in the compressed rubber layer 11 be oriented in the belt width direction, and that the short fibers be arranged to protrude from the surface of the compressed rubber layer 11. Instead of being mixed in the rubber compositions making the compressed rubber layer 11, the short fibers may be attached to the surface of the compressed rubber layer 11 by flocking, for example.

The backside reinforcing fabric 13 is made, for example, of a fabric material, such as woven fabric, knitted fabric, or nonwoven fabric comprised, for example, of yarns of cotton, polyamide fibers, polyester fibers, or aramid fibers. The backside reinforcing fabric 13 is subjected to an adhesion treatment so as to have adhesion to the V-ribbed belt body 10.

As illustrated in FIG. 2, the cord 14 is configured as a plied yarn obtained by subjecting four primarily-twisted yarns 14a, each of which has been obtained by subjecting a bundle of para-aramid fibers to a primary twist in one direction, to a secondary twist in the opposite direction to the primary twist. Examples of the plied yarn include a Z-twist yarn of which the primary twist is an S-twist and secondary twist is a Z-twist, and an S-twist yarn of which the primary twist is a Z-twist and secondary twist is an S-twist. The cord 14 is subjected to an adhesion treatment so as to have adhesion to the V-ribbed belt body 10.

Each of the filaments of the para-aramid fibers that constitute the cord 14 has a fiber fineness of, for example, 1.0 to 3.0 dtex, and a filament diameter of, for example, 10 to 15 μm. Examples of commercially available para-aramid fibers include Kevlar® manufactured by DuPont, and Twaron and Technora manufactured by TEIJIN LIMITED.

Each of the four primarily-twisted yarns 14a of the plied yarn that constitutes the cord 14 has a fiber fineness of 1000 to 1250 dtex, and preferably 1100 dtex. It is preferred that the four primarily-twisted yarns 14a each have the same fiber fineness.

Each of the primarily-twisted yarns 14a has a primary twist coefficient of 1200 to 1350. It is preferred that the four primarily-twisted yarns 14a each have the same twist coefficient for the primary twist. The plied yarn that constitutes the cord 14 has a secondary twist coefficient of 900 to 1100.

The primary twist coefficient is higher than the secondary twist coefficient. The ratio of the twist coefficient of the secondary twist to the twist coefficient of the primary twist (secondary twist coefficient/primary twist coefficient) is preferably 0.5 or more and more preferably 0.67 or more, and preferably 1 or less and more preferably 0.96 or less, and still more preferably 0.72 or less.

The twist coefficient is calculated by the following equation:

[Equation 1]
$$K = T \times \sqrt{D/1.1} \quad (A)$$

K: twist coefficient
T: the number of twists (twists/10 cm)
D: fiber fineness (dtex)

The number of primary twists is preferably 35 twists/10 cm or more, and more preferably 38 twists/10 cm or more, and preferably 46 twists/10 cm or less, and more preferably 43 twists/10 cm or less. The number of secondary twists is preferably 13 twists/10 cm or more, more preferably 14 twists/10 cm or more, and preferably 19 twists/10 cm or less, and more preferably 18 twists/10 cm or less.

The plied yarn that constitutes the cord 14 has a total fiber fineness of 4000 to 5000 dtex, and preferably 4400 dtex. The cord 14 preferably has an outside diameter of 0.73 to 0.83 mm. The outside diameter of the cord 14 is a maximum outside diameter of the cross-section of the cord 14.

The plied yarn that constitutes the cord 14 preferably has a strength of 680 N or more, and more preferably 720 N or more.

The cord 14 may be configured as a single plied yarn that is either a Z-twist yarn of which the secondary twist is a Z-twist or an S-twist yarn of which the secondary twist is an S-twist, and may be arranged in a helix form. In this case, the cord 14 is preferably configured as a Z-twist yarn of which the secondary twist is a Z-twist. Alternatively, the cord 14 may also be configured as two plied yarns consisting of a Z-twist yarn of which the secondary twist is a Z-twist and an S-twist yarn of which the secondary twist is an S-twist, and may be arranged in a double helix form. The distance between the respective centers of the cord 14 that are adjacent to each other in a cross-section is, for example, 0.05 to 0.20 mm.

The V-ribbed belt B according to the embodiment preferably has a strength of 2.1 kN or more, and more preferably 2.4 kN or more, per width of a V-shaped rib.

In recent years, adoption of downsizing engines has been considered as a measure for improving fuel efficiency of automobiles. Since such engines have a reduced number of cylinders, accessory drive V-ribbed belts attached to the engine undergo greater tension fluctuations than in conventional engines. Thus, the accessory drive V-ribbed belts are required to have high flex-fatigue resistance even under great impact repeatedly applied thereto.

To meet such a requirement, according to the V-ribbed belt B of the embodiment described above with such a configuration, the cord 14 embedded in the V-ribbed belt body 10 made of rubber is configured as a plied yarn with a total fiber fineness of 4000 to 5000 dtex. The plied yarn consists of four primarily-twisted yarns 14a, each being obtained by subjecting a bundle of para-aramid fibers with a fiber fineness of 1000 to 1250 dtex to a primary twist in one direction at a twist coefficient of 1200 to 1350. These four primarily-twisted yarns 14a are then subjected to a secondary twist in an opposite direction to the primary twist at a twist coefficient of 900 to 1100, thereby obtaining the plied yarn. This thus allows the V-ribbed belt B to have high flex-fatigue resistance even under great impact repeatedly applied thereto, as will be described later for Examples.

Figure 3B:
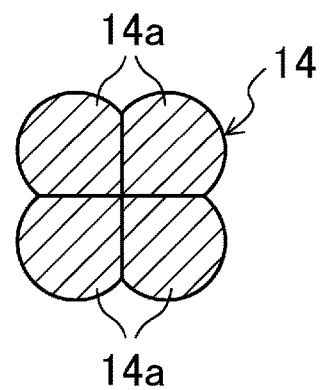
FIG. 3B is a cross-sectional view of a cord consisting of four primarily-twisted yarns.

The cord 14 of the V-ribbed belt B according to this embodiment is configured as a plied yarn with a total fiber fineness of 4000 to 5000 dtex. This plied yarn is comprised of a plurality of primarily-twisted yarns 14a, each being obtained by subjecting a bundle of para-aramid fibers with a fiber fineness of 1000 to 1250 dtex to a primary twist in one direction at a twist coefficient of 1200 to 1350, and these primarily-twisted yarns 14a are then subjected to a secondary twist in the opposite direction to the primary twist at a twist coefficient of 900 to 1100. The number of the primarily-twisted yarns 14a is set to be four so that the belt can have high flex-fatigue resistance. This setting is recommended for the following reasons. First, suppose there are less than four primarily-twisted yarns. In that case, the size of each of the primarily-twisted yarns needs to be increased, which causes an increase in the degree of migration (a phenomenon that filament positions tend to interchange between the inner zone and the outer zone within the primarily-twisted yarn) during a primary twist, and the filaments are thus subjected to non-uniform stresses when stretched. As a result, if the number of the primarily-twisted yarns is less than four, the strength would decrease significantly in the event of tension fluctuations. Next, suppose there are more than four primarily-twisted yarns. In that case, some of the primarily-twisted yarns 14a are/is present in the inner zone, and the others in the outer zone, in a cross-section of the cord 14 as illustrated in FIG. 3A. Then stress is concentrated on the primarily-twisted yarns 14a in the outer zone when stretched, since the primarily-twisted yarns 14a in the outer zone have greater tension than those/that in the inner zone. As a result, if the number of the primarily-twisted yarns is more than four, the strength would decrease significantly in the event of tension fluctuations. In contrast, if the cord 14 consists of four primarily-twisted yarns 14a like the V-ribbed belt B according to this embodiment, the four primarily-twisted yarns 14a are readily arranged in a square formation that is relatively well-balanced and stable, in a cross-section of the cord 14 as illustrated in FIG. 3B. Thus, stress is applied uniformly to all of those four primarily-twisted yarns 14a when stretched. This would be the reason why a decrease in the strength is minimized according to this embodiment even in the event of tension fluctuations.

Figure 4:
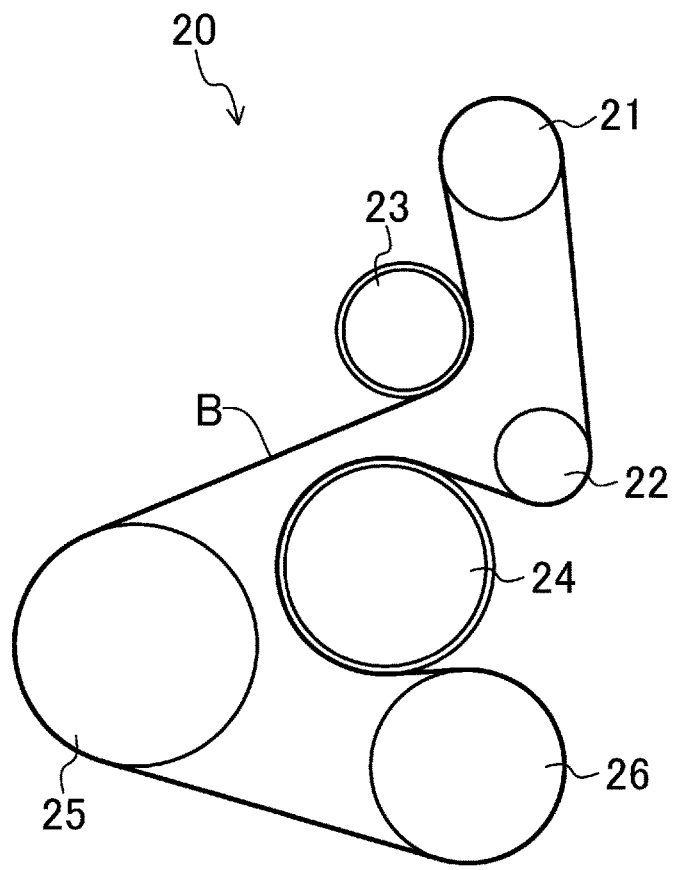
FIG. 4 illustrates a layout of pulleys for an accessory drive belt transmission system of an automobile using a V-ribbed belt according to the embodiment.

FIG. 4 illustrates a layout of pulleys for an accessory belt transmission system 20 of an automobile using the V-ribbed belt B according to this embodiment. This accessory belt transmission system 20 is a serpentine drive system in which the V-ribbed belt B is wound around six pulleys consisting of four ribbed pulleys and two flat pulleys.

This accessory belt transmission system 20 includes a power steering pulley 21, which is a ribbed pulley arranged at the uppermost position, and an AC generator pulley 22, which is a ribbed pulley arranged below the power steering pulley 21. Further, a tensioner pulley 23, which is a flat pulley, is arranged on a lower left side of the power steering pulley 21, and a water-pump pulley 24, which is a flat pulley, is arranged below the tensioner pulley 23. Furthermore, a crankshaft pulley 25, which is a ribbed pulley, is arranged on a lower left side of the tensioner pulley 23, and an air-conditioner pulley 26, which is a ribbed pulley, is arranged on a lower right side of the crankshaft pulley 25. These pulleys are pressed metal products, cast products, or molded resin products made of a nylon resin or a phenolic resin, and have a pulley diameter $\phi$ of 50 to 150 mm.

In this accessory belt transmission system 20, the V-ribbed belt B is sequentially wound around the power steering pulley 21 with the V-shaped ribs 15 brought into contact with the pulley 21. Next, the V-ribbed belt B is wound around the tensioner pulley 23 with the backside surface of the belt brought into contact with the pulley 23. Then the belt B is further wound around the crankshaft pulley 25 and the air-conditioner pulley 26 in this order with the V-shaped ribs 15 brought into contact with the pulleys 25 and 26. Thereafter, the belt B is wound around the water-pump pulley 24 with the backside of the belt brought into contact with the pulley 24, and subsequently wound around the AC generator pulley 22 with the V-shaped ribs 15 brought into contact with the pulley 22, and then returns to the power steering pulley 21. The belt span length, which is a length of the V-ribbed belt B between the pulleys, is, for example, 50 to 300 mm. The degree of misalignment permissible between the pulleys is 0 to 2° C.

(Method for Making V-Ribbed Belt B)

A method for making a V-ribbed belt B according to this embodiment will now be described.

The manufacturing process of the V-ribbed belt B according to this embodiment includes a material preparing step, a material positioning step, a vulcanization-molding step, a grinding step, and a width cutting step. The V-shaped ribs 15 of the V-ribbed belt B are formed through grinding in the grinding step.

<Material Preparing Step>

First, respective ingredients are added to a rubber component, and the mixture is kneaded by a mixer, such as a kneader or a Banbury mixer. A resultant uncrosslinked rubber composition is turned into a sheet by, for example, calendering to form an uncrosslinked rubber sheet 11' to be used as a compressed rubber layer 11. Short fibers may be added to this uncrosslinked rubber sheet 11' in forming a compressed rubber layer 11 with short fibers. An uncrosslinked rubber sheet 12' to be used as an adhesive rubber layer 12 is also formed in the same or similar manner.

Further, a fabric material 13' to function as a backside reinforcing fabric 13 is subjected to an adhesion treatment. Specifically, the fabric material 13' is subjected to one, two or more of the following adhesion treatments, namely, an adhesion treatment in which the fabric material 13' is immersed in a primer solution and heated, an adhesion treatment in which the fabric material 13' is immersed in an RFL aqueous solution and heated, an adhesion treatment in which the fabric material 13' is immersed in rubber cement and dried, and an adhesion treatment in which the surface to be in contact with the V-ribbed belt body 10 is coated with rubber cement and dried.

Further, a plied yarn 14' to function as the cord 14 is subjected to an adhesion treatment. Specifically, the plied yarn 14' is subjected to the following adhesion treatments, namely, an adhesion treatment in which the plied yarn 14' is immersed in a primer solution and heated, an adhesion treatment in which the plied yarn 14' is immersed in an RFL aqueous solution and heated, and an adhesion treatment in which the plied yarn 14' is immersed in rubber cement and dried.

<Material Positioning Step>

Figure 5:
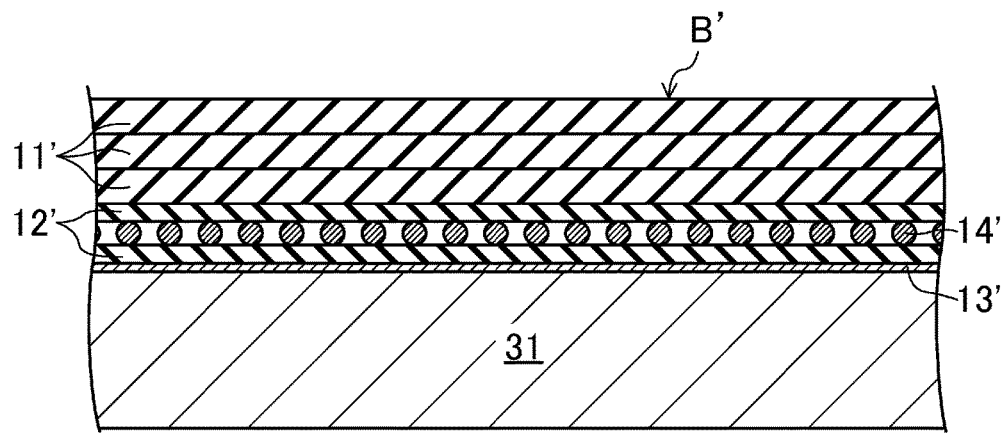
FIG. 5 is a first drawing illustrating a process step of a method for making the V-ribbed belt according to the embodiment.

Next, as illustrated in FIG. 5, the fabric material 13' which will function as the backside reinforcing fabric 13 and which has been subjected to the adhesion treatment, and the uncrosslinked rubber sheet 12' to be used as the adhesive rubber layer 12 are wrapped around a cylindrical mold 31 in this order to form two layers on the outer periphery of the cylindrical mold 31. Then, the plied yarn 14' which will function as the cord 14 and which has been subjected to the adhesion treatment is wound in a helical pattern around the cylindrical mold 31, with a predetermined tension applied to the plied yarns 14'. Thereafter, the uncrosslinked rubber sheet 12' to be used as the adhesive rubber layer 12 and the uncrosslinked rubber sheet 11' to be used as the compressed rubber layer 11 are wrapped around, and stacked one upon the other on the cylindrical mold 31 in this order, thereby obtaining a belt formation body B'.

<Vulcanization-Molding Step>

Figure 6:
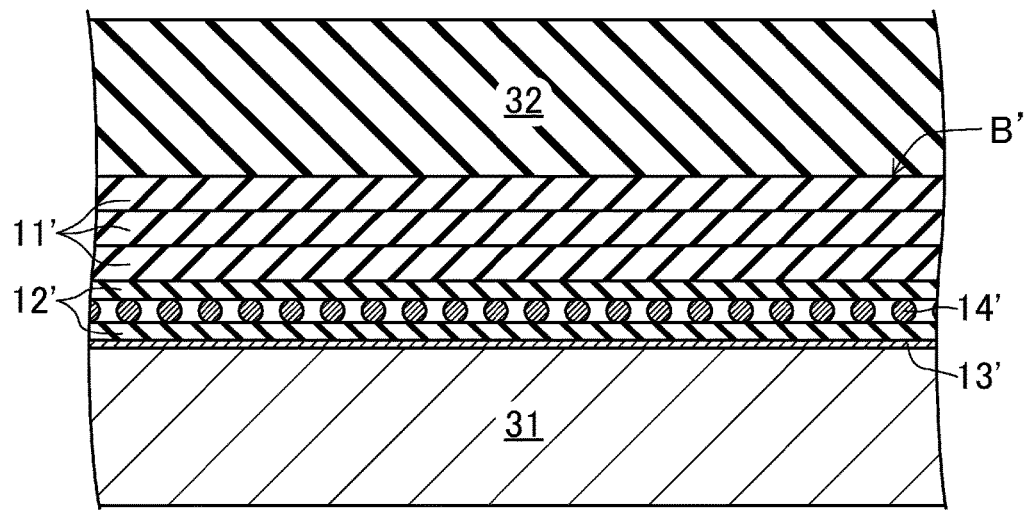
FIG. 6 is a second drawing illustrating another process step of the method for making the V-ribbed belt according to the embodiment.
Figure 7:
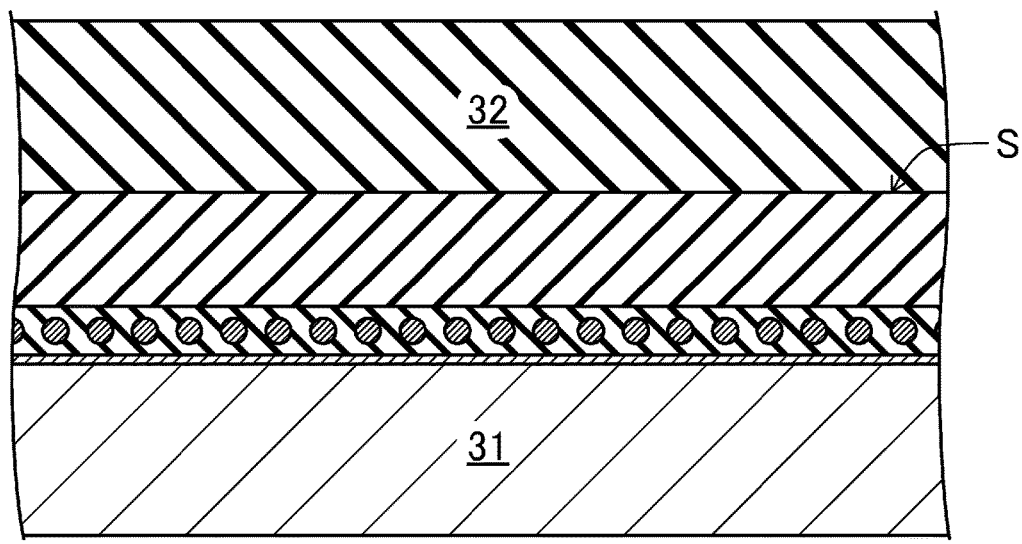
FIG. 7 is a third drawing illustrating still another process step of the method according to the embodiment.

Next, as illustrated in FIG. 6, the belt formation body B' is covered with a rubber sleeve 32. The belt formation body B' with the rubber sleeve 32 is placed in a vulcanizer, which is then sealed. The vulcanizer is filled with high-temperature and high-pressure steam, and the belt formation body B' with the rubber sleeve 32 is held in the vulcanizer for a predetermined molding time. In the meantime, cross-linking is promoted between the uncrosslinked rubber sheets 11' and 12', which are integrated together and combined with the fabric material 13' and the plied yarns 14'. As a result, as illustrated in FIG. 7, a cylindrical belt slab S is formed.

<Grinding Step>

Figure 8:
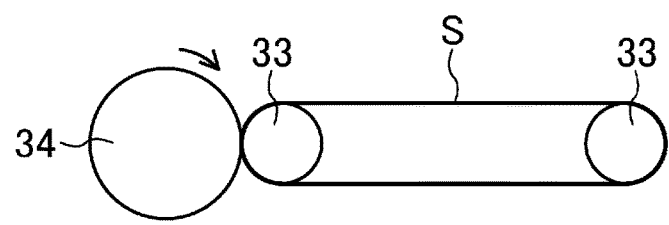
FIG. 8 is a fourth drawing illustrating yet another process step of the method according to the embodiment.
Figure 9:
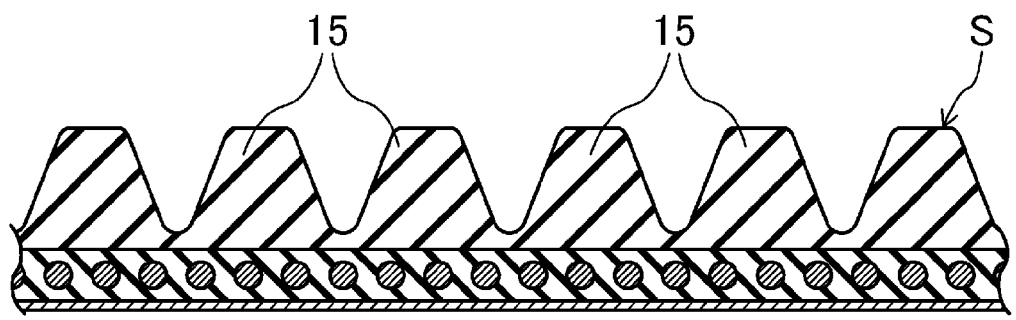
FIG. 9 is a fifth drawing illustrating yet another process step of the method according to the embodiment.

Subsequently, the steam is released from the vulcanizer to unseal the vulcanizer. The belt slab S formed on the cylindrical mold 31 is removed from the mold, and is looped over a pair of slab holding rods 33 as illustrated in FIG. 8. A grinding stone 34, which has, on its outer peripheral surface, V-shaped rib forming grooves extending in the circumferential direction of the grinding stone 34 and arranged side by side in the axial direction of the grinding stone 34, is brought into contact with the outer peripheral surface of the belt slab S, while being rotated. Meanwhile, the belt slab S is also rotated on the pair of slab holding rods 33, thereby grinding the belt slab S all around the outer peripheral surface thereof. As a result, V-shaped ribs 15 are formed on the outer peripheral surface of the belt slab S as illustrated in FIG. 9. If necessary, the belt slab S may be cut into pieces in its length direction before being ground.

<Width Cutting Step>

The belt slab S provided with the V-shaped ribs 15 through grinding is cut into pieces, each having a predetermined width, and turned inside out to obtain a V-ribbed belt B.

Other Embodiments

Figure 10A:
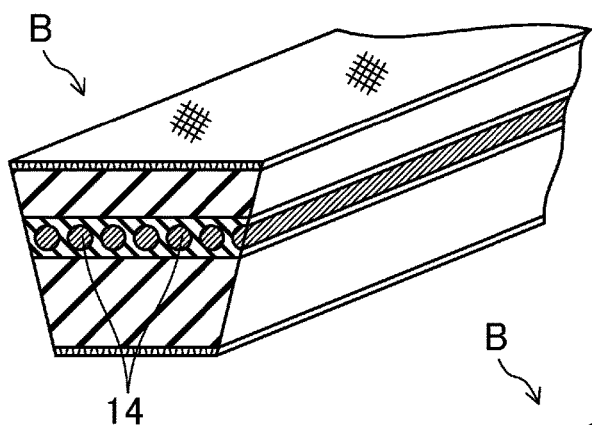
FIG. 10A is a perspective view illustrating a raw edge V belt according to another embodiment.
Figure 10B:
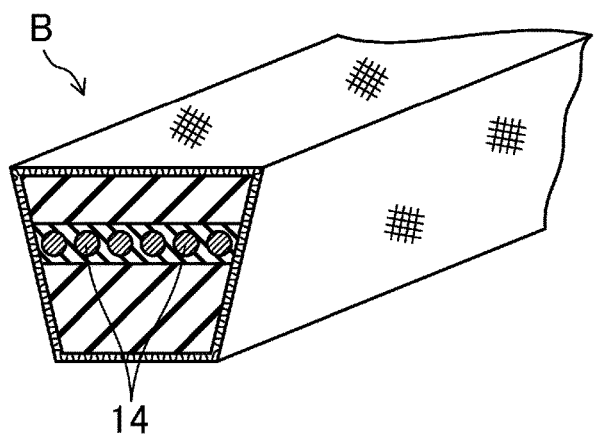
FIG. 10B is a perspective view illustrating a wrapped V belt according to another embodiment.
Figure 10C:
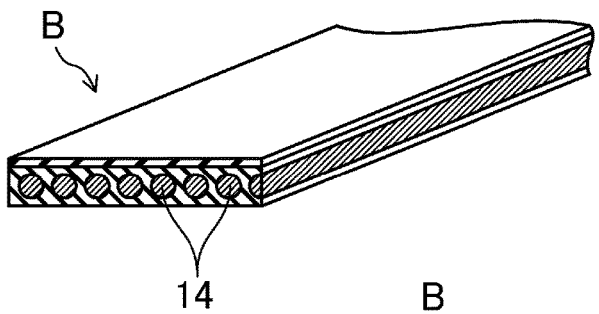
FIG. 10C is a perspective view illustrating a flat belt according to another embodiment.
Figure 10D:
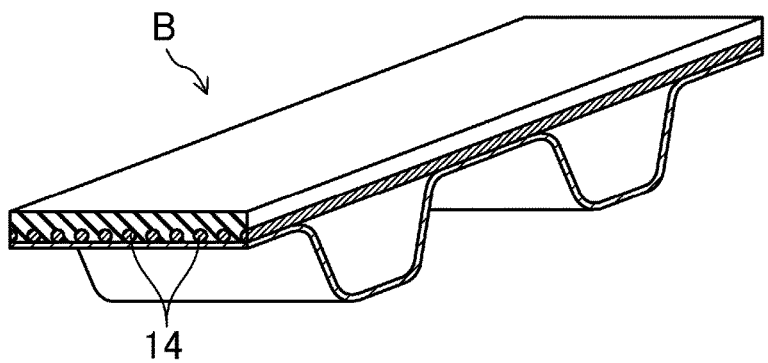
FIG. 10D is a perspective view illustrating a toothed belt according to another embodiment.

The embodiment described above is supposed to be configured as a V-ribbed belt B, but this is only a non-limiting example. The belt may also be a raw edge V belt as illustrated in FIG. 10A, or a wrapped V belt as illustrated in FIG. 10B, or a flat belt as illustrated in FIG. 10C, or a toothed belt as illustrated in FIG. 10C.

EXAMPLES

V-Ribbed Belt

V-ribbed belts representing Examples 1 to 4 and Comparative Examples 1 to 6, each including a cord configured as a plied yarn of para-aramid fibers, were formed by the same method as the method of the above embodiment. Each of the V-ribbed belts had a length of 1000 mm, a thickness of 4.0 mm, and a width of 10.68 mm with three V-shaped ribs. The configurations of the plied yarns which constitute the respective cords are also shown in the following Table 1:

TABLE 1

| | | Example | | | | Comparative Example | | | | | | | |
|---|---|---|---|---|---|---|---|---|---|---|---|---|---|
| | | 1 | 2 | 3 | 4 | 1 | 2 | 3 | 4 | 5 | 6 | 7 | 8 |
| Primary Twist | Fiber Fineness (dtex) | 1100 | 1100 | 1100 | 1100 | 1100 | 1100 | 1680 | 840 | 1100 | 1100 | 1100 | 1100 |
| | Number of Twists (twists/10 cm) | 42.9 | 42.9 | 38.1 | 38.1 | 40.5 | 40.5 | 32.8 | 46.4 | 40.5 | 40.5 | 46.05 | 34.95 |
| | Twist Coefficient | 1350 | 1350 | 1200 | 1200 | 1275 | 1275 | 1275 | 1275 | 1275 | 1275 | 1450 | 1100 |
| Twist Configuration | | 1 × 4 | 1 × 4 | 1 × 4 | 1 × 4 | 1 × 3 | 1 × 5 | 1 × 3 | 1 × 5 | 1 × 4 | 1 × 4 | 1 × 4 | 1 × 4 |
| Secondary Twist | Number of Twists (twists/10 cm) | 14.3 | 17.5 | 14.3 | 17.5 | 18.3 | 14.2 | 14.8 | 16.3 | 12.7 | 19.1 | 15.9 | 15.9 |
| | Twist Coefficient | 900 | 1100 | 900 | 1100 | 1000 | 1000 | 1000 | 1000 | 800 | 1200 | 1000 | 1000 |
| Secondary Twist Coefficient/Primary Twist Coefficient | | 0.67 | 0.81 | 0.75 | 0.92 | 0.78 | 0.78 | 0.78 | 0.78 | 0.63 | 0.94 | 0.69 | 0.91 |
| Total Fiber Fineness (dtex) | | 4400 | 4400 | 4400 | 4400 | 3300 | 5500 | 5040 | 4200 | 4400 | 4400 | 4400 | 4400 |
| Yarn Strength (N) | | 748 | 728 | 752 | 739 | 573 | 899 | 811 | 692 | 761 | 721 | 712 | 776 |
| Belt Strength (kN/V rib) | | 2.54 | 2.46 | 2.55 | 2.52 | 1.93 | 3.09 | 2.72 | 2.28 | 2.62 | 2.46 | 2.47 | 2.67 |
| Remaining Belt Strength (%) (after hundred thousand cycles) | | 99 | 98 | 98 | 99 | Torn apart | 70 | 77 | 89 | 85 | Torn apart | 82 | 61 |

Example 1

In the V-ribbed belt of Example 1, the cord of para-aramid fibers (product name: Twaron 1008, manufactured by TEIJIN LIMITED, with a filament fineness of 1.1 dtex and a filament diameter of 10.4 μm) was configured as a plied yarn that consists of four primarily-twisted yarns, each having been primarily twisted by subjecting a bundle of para-aramid fibers with a filament fineness of 1100 dtex to an S-twist in one direction at a twist coefficient of 1350 (the number of primary twists was 42.9 twists/10 cm). Then, these four primarily-twisted yarns were secondarily twisted by being subjected to a Z-twist in the opposite direction to the primary twist, at a twist coefficient of 900 (the number of secondary twists was 14.3 twists/10 cm), thereby obtaining a plied yarn with a total fiber fineness of 4400 dtex. The ratio of the twist coefficient of the secondary twist to that of the primary twist of this cord (i.e., the secondary twist coefficient/primary twist coefficient) was 0.67. The strength of the plied yarn constituting the cord was 748 N. The cord was configured as a single plied yarn, using a Z-twist yarn of which the secondary twist was a Z-twist.

The plied yarn that constituted the cord was subjected to adhesion treatments in which the plied yarn was immersed in a primer solution and heated, thereafter immersed in an RFL aqueous solution and heated, and then immersed in rubber cement and dried.

A toluene solution of polymethylene polyphenyl polyisocyanate was used as the primer solution. The adhesion treatment using the primer solution was performed once.

To make the RFL aqueous solution, resorcin (R) and 37 mass % of a formaldehyde aqueous solution (F: formalin) were mixed together and stirred, and an aqueous sodium hydroxide solution was added to this mixture and was further stirred. Thereafter, water was added to the RF aqueous solution, which was matured before latex (L) of chlorosulfonated polyethylene rubber (CSM) was mixed therein to obtain the RFL aqueous solution. The adhesion treatments using the RFL aqueous solution were performed twice successively.

An uncrosslinked rubber composition making the adhesive rubber layer to be described later was dissolved in toluene, and the material thus obtained was used as the rubber cement. The adhesion treatment using the rubber cement was performed once.

The pitch of helical winding of the plied yarn around the cylindrical mold was set to be 0.95 mm.

The strength of the V-ribbed belt of Example 1 per width of a V-shaped rib was 2.54 kN.

The compressed rubber layer and the adhesive rubber layer were made of an uncrosslinked rubber composition having EPDM as a rubber component. Further, the backside reinforcing fabric was made of a woven fabric using blended yarns of cotton/polyester fibers.

Example 2

A V-ribbed belt of Example 2 had the same configuration as the V-ribbed belt of Example 1 except that the cord was configured as a plied yarn in which the twist coefficient of the secondary twist was set to be 1100 (the number of secondary twists was 17.5 twists/10 cm). This cord had a secondary twist coefficient/primary twist coefficient ratio of 0.81. The plied yarn constituting the cord had a strength of 728 N.

The V-ribbed belt of Example 2 had a strength of 2.46 kN per width of a V-shaped rib.

Example 3

A V-ribbed belt of Example 3 had the same configuration as the V-ribbed belt of Example 1 except that the cord was configured as a plied yarn in which the twist coefficient of the primary twist was set to be 1200 (the number of primary twists was 38.1 twists/10 cm). This cord had a secondary twist coefficient/primary twist coefficient ratio of 0.75. The plied yarn constituting the cord had a strength of 752 N.

The V-ribbed belt of Example 3 had a strength of 2.55 kN per width of a V-shaped rib.

Example 4

A V-ribbed belt of Example 4 had the same configuration as the V-ribbed belt of Example 1 except that the cord was configured as a plied yarn in which the twist coefficient of the primary twist was set to be 1200 (the number of primary twists was 38.1 twists/10 cm) and the twist coefficient of the secondary twist was set to be 1100 (the number of secondary twists was 17.5 twists/10 cm). This cord had a secondary twist coefficient/primary twist coefficient ratio of 0.92. The plied yarn constituting the cord had a strength of 739 N.

The V-ribbed belt of Example 4 had a strength of 2.52 kN per width of a V-shaped rib.

Comparative Example 1

A V-ribbed belt of Comparative Example 1 had the same configuration as the V-ribbed belt of Example 1 except that cord was configured as a plied yarn consisting of three primarily-twisted yarns, each having been primarily twisted by subjecting a bundle of para-aramid fibers with a fiber fineness of 1100 dtex to an S-twist in one direction at a twist coefficient of 1275 (the number of primary twists was 40.5 twists/10 cm), that these three primarily-twisted yarns were then secondarily twisted by being subjected to a Z-twist in the opposite direction to the primary twist, at a twist coefficient of 1000 (the number of secondary twists was 18.3 twists/10 cm), thereby obtaining a plied yarn with a total fiber fineness of 3300 dtex, and that the pitch of the helical winding of the plied yarn thus obtained around the cylindrical mold was set to be 0.85 mm. This cord had a secondary twist coefficient/primary twist coefficient ratio of 0.78. The plied yarn constituting the cord had a strength of 573 N.

The V-ribbed belt of Comparative Example 1 had a strength of 1.93 kN per width of a V-shaped rib.

Comparative Example 2

A V-ribbed belt of Comparative Example 2 had the same configuration as the V-ribbed belt of Example 1 except that the cord was configured as a plied yarn consisting of five primarily-twisted yarns, each having been primarily twisted by subjecting a bundle of para-aramid fibers with a fiber fineness of 1100 dtex to an S-twist in one direction at a twist coefficient of 1275 (the number of primary twists was 40.5 twists/10 cm), that these five primarily-twisted yarns were then secondarily twisted by being subjected to a Z-twist in the opposite direction to the primary twist, at a twist coefficient of 1000 (the number of secondary twists was 14.2 twists/10 cm), thereby obtaining a plied yarn with a total fiber fineness of 5500 dtex, and that the pitch of the helical winding of the plied yarn thus obtained around the cylindrical mold was set to be 1.05 mm. This cord had a secondary twist coefficient/primary twist coefficient ratio of 0.78. The plied yarn constituting the cord had a strength of 899 N.

The V-ribbed belt of Comparative Example 2 had a strength of 3.09 N per width of a V-shaped rib.

Comparative Example 3

A V-ribbed belt of Comparative Example 3 had the same configuration as the V-ribbed belt of Example 1 except that cord was configured as a plied yarn consisting of three primarily-twisted yarns, each having been primarily twisted by subjecting a bundle of para-aramid fibers with a fiber fineness of 1680 dtex to an S-twist in one direction at a twist coefficient of 1275 (the number of primary twists was 32.8 twists/10 cm), that these three primarily-twisted yarns were then secondarily twisted by being subjected to a Z-twist in the opposite direction to the primary twist, at a twist coefficient of 1000 (the number of secondary twists was 14.8 twists/10 cm), thereby obtaining a plied yarn with a total fiber fineness of 5040 dtex. This cord had a secondary twist coefficient/primary twist coefficient ratio of 0.78. The plied yarn constituting the cord had a strength of 811 N.

The V-ribbed belt of Comparative Example 3 had a strength of 2.72 N per width of a V-shaped rib.

Comparative Example 4

A V-ribbed belt of Comparative Example 4 had the same configuration as the V-ribbed belt of Example 1 except that the cord was configured as a plied yarn consisting of five primarily-twisted yarns, each having been primarily twisted by subjecting a bundle of para-aramid fibers with a fiber fineness of 840 dtex to an S-twist in one direction at a twist coefficient of 1275 (the number of primary twists was 46.4 twists/10 cm), that these five primarily-twisted yarns were then secondarily twisted by being subjected to a Z-twist in the opposite direction to the primary twist, at a twist coefficient of 1000 (the number of secondary twists was 16.3 twists/10 cm), thereby obtaining a plied yarn with a total fiber fineness of 4200 dtex. This cord had a secondary twist coefficient/primary twist coefficient ratio of 0.78. The plied yarn constituting the cord had a strength of 692 N.

The V-ribbed belt of Comparative Example 4 had a strength of 2.28 N per width of a V-shaped rib.

Comparative Example 5

A V-ribbed belt of Comparative Example 5 had the same configuration as the V-ribbed belt of Example 1 except that the cord was configured as a plied yarn with a primary twist coefficient of 1275 (the number of primary twists was 40.5 twists/10 cm) and with a secondary twist coefficient of 800 (the number of secondary twists was 12.7 twists/10 cm). This cord had a secondary twist coefficient/primary twist coefficient ratio of 0.63. The plied yarn constituting the cord had a strength of 761 N.

The V-ribbed belt of Comparative Example 5 had a strength of 2.62 kN per width of a V-shaped rib.

Comparative Example 6

A V-ribbed belt of Comparative Example 6 had the same configuration as the V-ribbed belt of Example 1 except that the cord was configured as a plied yarn with a primary twist coefficient of 1275 (the number of primary twists was 40.5 twists/10 cm) and with a secondary twist coefficient of 1200 (the number of secondary twists was 19.1 twists/10 cm). This cord had a secondary twist coefficient/primary twist coefficient ratio of 0.94. The plied yarn constituting the cord had a strength of 721 N.

The V-ribbed belt of Comparative Example 6 had a strength of 2.46 N per width of a V-shaped rib.

Comparative Example 7

A V-ribbed belt of Comparative Example 7 had the same configuration as the V-ribbed belt of Example 1 except that the cord was configured as a plied yarn with a primary twist coefficient of 1450 (the number of primary twists was 46.05 twists/10 cm) and with a secondary twist coefficient of 1000 (the number of secondary twists was 15.9 twists/10 cm). This cord had a secondary twist coefficient/primary twist coefficient ratio of 0.69. The plied yarn constituting the cord had a strength of 712 N.

The V-ribbed belt of Comparative Example 7 had a strength of 2.47 kN per width of a V-shaped rib.

Comparative Example 8

A V-ribbed belt of Comparative Example 8 had the same configuration as the V-ribbed belt of Example 1 except that the cord was configured as a plied yarn with a primary twist coefficient of 1100 (the number of primary twists was 34.95 twists/10 cm) and with a secondary twist coefficient of 1000 (the number of secondary twists was 15.9 twists/10 cm). This cord had a secondary twist coefficient/primary twist coefficient ratio of 0.91. The plied yarn constituting the cord had a strength of 776 N.

The V-ribbed belt of Comparative Example 8 had a strength of 2.67 kN per width of a V-shaped rib.

(Belt Running Test)

Figure 11:
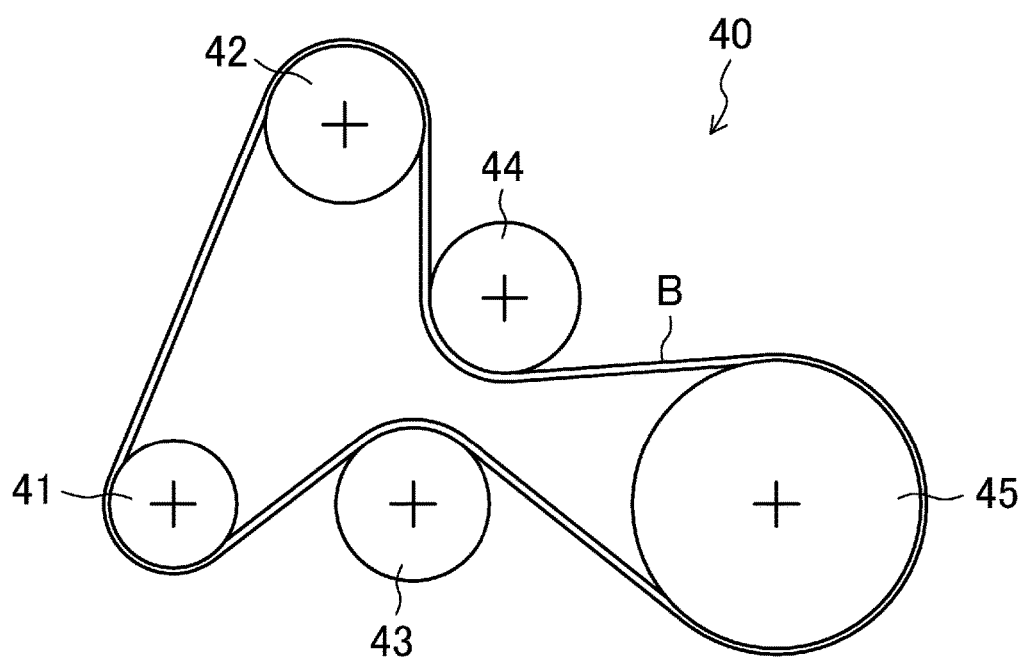
FIG. 11 illustrates a layout of pulleys for a belt running tester.

FIG. 11 illustrates a layout of pulleys for a belt running tester 40.

The belt running tester 40 includes a drive pulley 41 with a diameter of 50 mm, a first idler pulley 42 having a diameter of 80 mm and arranged on the upper right side of the drive pulley 41, a second idler pulley 43 having a diameter of 75 mm and arranged on the right side of the drive pulley 41, an auto tensioner pulley 44 having a diameter of 76 mm and arranged on the upper right side of the second idler pulley 43 so as to be movable to the right and to the left, and a driven pulley 45 having a diameter of 140 mm and arranged on the right side of the second idler pulley 43. The drive pulley 41, the first idler pulley 42, and the driven pulley 45 are ribbed pulleys. The second idler pulley 43 and the auto tensioner pulley 44 are flat pulleys.

The V-ribbed belt B of each of Examples 1 to 4 and Comparative Examples 1 to 8 was wound around the pulleys of the belt running tester 40 such that the V-shaped ribs of the belt would be in contact with the drive pulley 41, the first idler pulley 42, and the driven pulley 45, and that the backside of the belt would be in contact with the second idler pulley 43 and the auto tensioner pulley 44, and a tension of 660 N was applied to the belt, using the auto tensioner pulley 44. A belt running test was performed by changing the number of rotations of the drive pulley 41 from 0 to 1000 rpm every four seconds at room temperature (25° C.). Great impact was repeatedly applied to the V-ribbed belt B, because a tension of at most 560 N per width of a V-shaped rib was applied to the belt while the number of rotations of the drive pulley 41 was rising, and the V-ribbed belt B loosened while the number of rotations of the drive pulley 41 was falling, due to inertial rotations of the driven pulley 45. In Examples 1 to 4 and Comparative Examples 2, 3, 5 and 6, the strength of the belt was measured after hundred thousand rotational change cycles of the belt running. The belt strength thus obtained was converted to a belt strength per cord. The strength of an unused belt of the same lot which had been measured beforehand was divided by that belt strength per cord, thereby calculating the percentage of remaining belt strength. In Comparative Examples 1 and 4, the belt was torn apart before the completion of the hundred thousand rotational change cycles of the belt running.

(Test Results)

Table 1 shows the test results.

The results shown in Table 1 reveal that, compared to the belts of Comparative Examples 1 to 8, the belts of Examples 1 to 4 had much higher remaining strength after the belt running tests, that is, the belts had high flex-fatigue resistance even under great impact repeatedly applied thereto. In Examples 1 to 4, the cords were each configured as a plied yarn with a total fiber fineness of 4400 dtex, and the plied yarn consisted of four primarily-twisted yarns, each having been obtained by subjecting a bundle of para-aramid fibers with a fiber fineness of 1100 dtex to a primary twist in one direction at a twist coefficient of 1200 to 1350, and these four primarily-twisted yarns were then secondarily twisted in an opposite direction to the primary twist at a twist coefficient of 900 to 1100, thereby obtaining the plied yarn.

The present invention is useful for a power transmission belt and a belt transmission system including the power transmission belt.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt with a cord embedded in a belt body made of rubber, wherein
the cord is configured as a plied yarn with a total fiber fineness of 4000 to 5000 dtex, the plied yarn consisting of four primarily-twisted yarns, each being obtained by subjecting a bundle of para-aramid fibers with a fiber fineness of 1000 to 1250 dtex to a primary twist in one direction at a twist coefficient of 1200 to 1350, and the four primarily-twisted yarns are subjected to a secondary twist in an opposite direction to the primary twist at a twist coefficient of 900 to 1100 to make the plied yarn.

2. The power transmission belt of claim 1, wherein
a ratio of the twist coefficient of the secondary twist to that of the primary twist (twist coefficient of the secondary twist/the twist coefficient of the primary twist) of the plied yarn which constitutes the cord is 0.5 to 1.

3. The power transmission belt of claim 1, wherein
each of the four primarily-twisted yarns of the plied yarn that constitutes the cord is primarily twisted 35 to 46 times/10 cm.

4. The power transmission belt of claim 1, wherein
the plied yarn that constitutes the cord is secondarily twisted 13 to 19 times/10 cm.

5. The power transmission belt of claim 1, wherein
the cord has an outside diameter of 0.73 to 0.83 mm.

6. The power transmission belt of claim 1, wherein
the plied yarn that constitutes the cord has a strength of more than or equal to 680 N.

7. The power transmission belt of claim 1, wherein
the cord is configured as a single plied yarn, of which the secondary twist is a Z-twist.

8. The power transmission belt of claim 1, wherein
the four primarily-twisted yarns of the plied yarn that constitutes the cord have the same fiber fineness.

9. The power transmission belt of claim 1, wherein
the four primarily-twisted yarns of the plied yarn that constitutes the cord have the same primary twist coefficient.

10. The power transmission belt of claim 1, wherein
each of the four primarily-twisted yarns of the plied yarn that constitutes the cord has a fiber fineness of 1100 dtex.

11. The power transmission belt of claim 1, wherein
the plied yarn that constitutes the cord has a total fiber fineness of 4400 dtex.

12. The power transmission belt of claim 1, wherein
the belt body is a V-ribbed belt body.

13. The power transmission belt of claim 12, wherein
the power transmission belt has a strength of more than or equal to 2.4 kN per width of a V-shaped rib.

14. A belt transmission system in which the power transmission belt of claim 1 is wound around a plurality of pulleys.

* * * * *